US012484867B2

(12) United States Patent
Gélinas

(10) Patent No.: US 12,484,867 B2
(45) Date of Patent: Dec. 2, 2025

(54) SYSTEM FOR TARGETED MEDICAL INTERVENTION USING A MAGNETIC FIELD

(71) Applicant: STARPAX BIOPHARMA INC., Montréal (CA)

(72) Inventor: François Gélinas, Montreal (CA)

(*) Notice: Subject to any disclaimer, the term of this patent is extended or adjusted under 35 U.S.C. 154(b) by 392 days.

(21) Appl. No.: 17/980,673

(22) Filed: Nov. 4, 2022

(65) Prior Publication Data
US 2023/0157654 A1 May 25, 2023

Related U.S. Application Data

(63) Continuation of application No. PCT/CA2021/051776, filed on Dec. 10, 2021.

(60) Provisional application No. 63/280,041, filed on Nov. 16, 2021.

(51) Int. Cl.
A61B 6/00 (2024.01)

(52) U.S. Cl.
CPC .......... *A61B 6/4441* (2013.01); *A61B 6/4405* (2013.01)

(58) Field of Classification Search
CPC ..... A61B 6/4441; A61B 6/4405; A61B 34/73; A61B 6/0407; A61B 6/467; A61B 6/481; A61B 2034/732; A61P 35/00; C12N 1/20; H01F 7/20
See application file for complete search history.

(56) References Cited

U.S. PATENT DOCUMENTS

| 7,873,401 B2 | 1/2011 | Shachar |
| 8,457,714 B2 | 6/2013 | Shachar et al. |
| 8,684,010 B2 | 4/2014 | Shachar et al. |

(Continued)

FOREIGN PATENT DOCUMENTS

| JP | 2007173580 A | 7/2007 |
| JP | 2007236962 A | 9/2007 |

(Continued)

OTHER PUBLICATIONS

Welcome to Magnetecs. A brief look at who we are. Magnetecs, guiding medical technology. Megnetecs Media and Presentations. Retrieved on Nov. 10, 2022 from the website: https://www.magnetecs.com/media.php#.

(Continued)

*Primary Examiner* — David P Porta
*Assistant Examiner* — Gisselle M Gutierrez
(74) *Attorney, Agent, or Firm* — Anglehart et al.

(57) ABSTRACT

A system for steering magnetotactic entities in a subject having a propulsion system for navigating in a body of the subject using a magnetic field sufficient for influencing the direction of the magnetotactic entities while not without inducing a displacement force on the magnetotactic entities; it has a table for receiving a subject; three pairs of magnetic heads for generating the magnetic field for influencing a direction of the magnetotactic entities in a subject; and a support structure, surrounding the table, for supporting each of the magnetic heads of the three pairs of magnetic heads in a configuration wherein each pair is aligned along one of three axes and wherein each of the magnetic heads of each pair of the three pairs are facing one another, wherein the magnetic heads of the three pairs surround the table.

13 Claims, 11 Drawing Sheets

(56) References Cited

U.S. PATENT DOCUMENTS

| | | | |
|---|---|---|---|
| 8,986,214 B2 | 3/2015 | Shachar et al. | |
| 9,220,425 B2 | 12/2015 | Shachar et al. | |
| 9,381,063 B2 | 7/2016 | Gang et al. | |
| 9,655,539 B2 | 5/2017 | Shachar et al. | |
| 9,905,347 B2 | 2/2018 | Martel et al. | |
| 10,549,981 B2* | 2/2020 | Takimoto | B81B 3/001 |
| 2005/0096589 A1 | 5/2005 | Shachar | |
| 2006/0073540 A1* | 4/2006 | Martel | C12N 13/00 435/252.1 |
| 2009/0248014 A1 | 10/2009 | Shachar et al. | |
| 2009/0275828 A1 | 11/2009 | Shachar et al. | |
| 2010/0305402 A1 | 12/2010 | Shachar et al. | |
| 2011/0092808 A1 | 4/2011 | Shachar et al. | |
| 2011/0105825 A1 | 5/2011 | Nayfach-Battilana | |
| 2012/0288838 A1 | 11/2012 | Shachar et al. | |
| 2012/0289822 A1 | 11/2012 | Shachar et al. | |
| 2012/0310111 A1 | 12/2012 | Shachar et al. | |
| 2013/0006100 A1 | 1/2013 | Shachar et al. | |
| 2014/0187862 A1 | 7/2014 | Nishihara et al. | |
| 2015/0243425 A1* | 8/2015 | Martel | A61B 34/70 361/147 |
| 2018/0102206 A1* | 4/2018 | Martel | A61B 34/73 |
| 2021/0052190 A1* | 2/2021 | Kiselyov | G01R 33/287 |
| 2022/0257671 A1* | 8/2022 | Gueroui | C07K 14/195 |
| 2023/0398221 A1* | 12/2023 | Martel | A61K 47/6901 |

FOREIGN PATENT DOCUMENTS

| | | |
|---|---|---|
| JP | 2019013776 A | 1/2019 |
| WO | 2012/046157 A1 | 4/2012 |
| WO | 2013/185204 A1 | 12/2013 |

OTHER PUBLICATIONS

YouTube video: Présentation de l'Institut TransMedTech, posted Apr. 24, 2017. Realisation : Jean-Pierre Serra. Retrieved on Nov. 10, 2022 from the website: https://youtu.be/Prk0vuUo0Gc.

International application No. PCT/CA2021/051776 International Search Report dated 2022-08-16.

International application No. PCT/CA2021/051776 Written Opinion of the International Searching Authority dated Aug. 16, 2022.

* cited by examiner

SYSTEM FOR TARGETED MEDICAL INTERVENTION USING A MAGNETIC FIELD

The present application is a continuation application of international PCT patent application No. PCT/CA2021/051776, filed on Dec. 10, 2021, which claims priority from U.S. provisional patent application No. 63/280,041 filed on Nov. 16, 2021, incorporated herein by reference.

TECHNICAL FIELD

The present disclosure relates to targeted intervention in a subject using a magnetic field, and more particularly to targeted intervention in a subject using magnetotactic entities that are steered with a magnetic field.

BACKGROUND

Use of a magnetic field for medical interventions is becoming increasingly more prevalent. For instance, the following patent documents describe prior art medical applications harnessing a magnetic field: U.S. Pat. Nos. 9,655,539, 9,381,063, 9,220,425, 8,986,214, 8,684,010, 8,457,714, US20130006100, US20120310111, US20120289822, US20120288838, US20110092808, U.S. Pat. No. 7,873,401, US20100305402, US20090275828, US20090248014, US20050096589, etc.

Recently, the use of magnetotactic entities, used with an applied magnetic field, has also been studied for medical purposes.

Magnetotactic entities are defined as untethered entities where the source of propulsion or the system responsible for the displacement of the entity is part of, attached to, or embedded in the entity itself. Magnetotactic entities include a group of objects or microorganisms and any biological system or hybrid system including micro- and nano-systems or structures made of biological and/or synthetic (including chemical, artificial, etc.) materials and/or components where the directional motion can be influenced by inducing a torque from a directional magnetic field (e.g. from a permanent magnet) or electro-magnetic field (magnetic field includes here electro-magnetic field generated by an electrical current flowing in a conductor), a method referred to here as magnetotaxis where the direction of motion of such magnetotactic entities is influenced by a directional magnetic field (the magnetotactic entities can also be functionalized and be attached to other structures if required). Examples of such magnetotactic entities include but are not limited to a single or a group (swarm, agglomeration, aggregate, etc.) of flagellated Magnetotactic Bacteria (MTB), or other bacteria or other microorganisms capable of self-propulsion and influenced for the purpose of directional control by a directional magnetic field that could have been modified previously accordingly from various methods including but not limited to cultivation parameters, genetics, or attached, embedded to other entities modified to allow control by magnetotaxis such as other cells (including red blood cells), or attached to a synthetic structure that can be influenced by a directional magnetic field or gradient, or by adding micro- or nano-components to the bacteria, cells, or other microorganisms to make the directional motion of the implementation including hybrid (made of biological and synthetic components) implementation sensitive to magnetotaxis or a directional magnetic field such as the one capable of influencing the direction of a magnetic nano-compass needle.

U.S. Pat. No. 9,905,347, incorporated herein by reference describes a system for steering magnetotactic entities in a subject. U.S. Pat. No. 9,905,347 describes a system and method for generating a 3D-convergence point using at least three sets of magnetic field sources arranged along three axes or in three planes. However, the development of such a system that is adapted for clinical use and for a plurality of interventions relating to different ailments entails certain logistic and dimensional quandaries. This is due to space constraints, the size of the magnetic field sources and the generating of a 3D convergence point in subject that is positioned in proximity of the magnetic field sources.

SUMMARY

The present disclosure relates to a system for steering magnetotactic entities in a subject, and more particularly to the layout of the system that fits six magnetic field sources (three pairs of two magnetic heads), a platform or table for receiving a subject and an imaging device, while providing for sufficient space for allowing a physician to perform medical interventions on the subject that is resting on the table.

The system includes a support structure for receiving and fixing the magnetic heads in a given orientation. The support structure surrounds the table on which the subject is laid, such that the magnetic heads can generate a magnetic field for steering the magnetotactic entities in a subject to a target zone, where the steering may be done in three dimensions, where each pair of magnetic heads is aligned with a given one of three axes.

The pairs of magnetic heads can generate a 3D convergence point towards which the magnetotactic entities will navigate towards and converge. A three-dimensional convergence point (CP) in a magnetic field is a point, unbounded in space, to which the entities following the direction of the magnetic field in an aggregation zone (AZ) will move to and aggregate. The magnetic field at the convergence point is effectively zero and surrounding the convergence point in the aggregation zone, the effective field points from all directions to the convergence point. Because a magnetic field is not a point source, at least one of the magnetic field sources will be time-varied to cause the entities to move toward the convergence point and stay close to the convergence point.

Therefore, maintaining any two axes (x, y or z) with a constant (static) magnetic field and changing the direction of the other axis depending upon the other two axes being maintained constant will generate a convergence point. Similarly, maintaining one axis constant and changing the direction of the other two axes in a time-multiplexed fashion at the same time (synchronized) or with a phase shift (e.g., phase delay) will function to generate a convergence point, provided that, when the magnetotactic entity is a magnetotactic bacteria, the change is done at a frequency that allows for appropriate reaction of the magnetotactic entity, such as between 0.1 and 5 Hz or preferably about 0.5 Hz. The direction of all three axes can be changed in a time-multiplexed fashion simultaneously or with a delay between each axis. All combinations are possible provided that the magnetic field gradient of at least one axis (x, y or z) changes direction in a time-multiplexed fashion with a switching speed appropriate with the reaction time of the magnetotactic entities.

A broad aspect is a system for steering magnetotactic entities in a subject, the magnetotactic entities having a propulsion system for navigating in a body of the subject using a magnetic field sufficient for influencing the direction of the magnetotactic entities on the magnetotactic entities. The system includes a table for receiving a subject; three pairs of magnetic heads for generating the magnetic field for influencing a direction of the magnetotactic entities in a subject; and a support structure, surrounding the table, for supporting each of the magnetic heads of the three pairs of magnetic heads in a configuration wherein each pair is aligned along one of three axes and wherein each of the magnetic heads of each pair of the three pairs are facing one another, wherein the magnetic heads of the three pairs surround the table.

In some embodiments, a first magnetic head of a first pair of the three pairs may be placed under the table, joined to a portion of the support structure.

In some embodiments, the first magnetic head of the first pair of the three pairs may be at an angle with an axis that is orthogonal with a length of the table.

In some embodiments, the support structure may include a support arch for receiving a first magnetic head of a second pair of the three pairs of magnetic heads, a first magnetic head of a third pair of the three pairs of magnetic heads and a second magnetic head of the first pair of the three pairs of magnetic heads.

In some embodiments, the legs of the support arch may be oriented with respect to one another to create an angle of 90 degrees.

In some embodiments, the first magnetic head of the second pair of the three pairs of magnetic heads may be received at or near a bottom of a first leg portion of the support arch and the first magnetic head of the third pair of the three pairs of magnetic heads is received at or near a bottom of a second leg portion of the support arch.

In some embodiments, the support structure may include two support arms, wherein a first of the two support arms receives a second magnetic head of a second pair of the three pairs of magnetic heads and a second of the two support arms receives a second magnetic head of a third pair of the three pairs of magnetic heads.

In some embodiments, the first of the two support arms may receive the second magnetic head of a second pair of the three pairs of magnetic heads at or near a top of the first of the two support arms and the second of the two support arms receives a second magnetic head of a third pair of the three pairs of magnetic heads at a top of the second of the two support arms.

In some embodiments, the support structure may include a support arch for receiving a first magnetic head of a first pair of the three pairs of magnetic heads, a first magnetic head of a second pair of the three pairs of magnetic heads, and a first magnetic head of a third pair of the three pairs; and two support arms, wherein a first of the two support arms receives a second magnetic head of the second pair of the three pairs of magnetic heads and a second of the two support arms receives a second magnetic head of the third pair of the three pairs of magnetic heads.

In some embodiments, the two support arms may be each positioned on opposite sides at or near a first end of the table and the support arch is positioned at or near a second end of the table opposite the first end of the table.

In some embodiments, the system may include an x-ray image intensifier located between the support arch and one of the two support arms for generating imaging information of the subject.

In some embodiments, the system may include an actuator for displacing the table along at least one of the three axes.

In some embodiments, the actuator may be configured to displace the table vertically.

In some embodiments, the actuator may be configured to rotate the table.

In some embodiments, the three pairs of magnetic heads may be configured to generate a 3D convergence point that is a point, unbounded in space, to which the magnetotactic entities following a direction of the magnetic field in an aggregation zone will move to and aggregate in the body of the subject.

Another broad aspect is a system for steering self-propelled magnetotactic entities in a body of a subject. The system includes a first vertical support oriented in a transverse direction (y-axis) and having an upper portion in communication with a first lower portion (+y) and a second lower portion (−y); a second vertical support spaced from the first lower portion (+y) of the first vertical support in a longitudinal direction (+x); a third vertical support spaced from the second lower portion (−y) of the first vertical support in the longitudinal direction (+x) and spaced from the second vertical support in the transverse direction (y-axis); and a first pair of opposing magnetic heads arranged along a first axis, a first magnetic head of the first pair of opposing magnetic heads being affixed to the upper portion of the first vertical support and a second magnetic head of the first pair of opposing magnetic heads being affixed to a floor, the first axis forming an acute angle with respect to a plane of the floor; a second pair of opposing magnetic heads arranged along a second axis substantially orthogonal to the first axis, a first magnetic head of the second pair of opposing magnetic heads being affixed to the second lower portion (−y) of the first vertical support and a second magnetic head of the second pair of opposing magnetic heads being affixed to an upper portion of the second vertical support (+y); and a third pair of opposing magnetic heads arranged along a third axis substantially orthogonal to the first axis and the second axis, a first magnetic head of the third pair of opposing magnetic heads being affixed to the first lower portion (+y) of the first vertical support and a second magnetic head of the third pair of opposing magnetic heads being affixed to an upper portion of the third vertical support.

BRIEF DESCRIPTION OF THE DRAWINGS

The invention will be better understood by way of the following detailed description of embodiments of the invention with reference to the appended drawings, in which.

DETAILED DESCRIPTION

Figure 1:
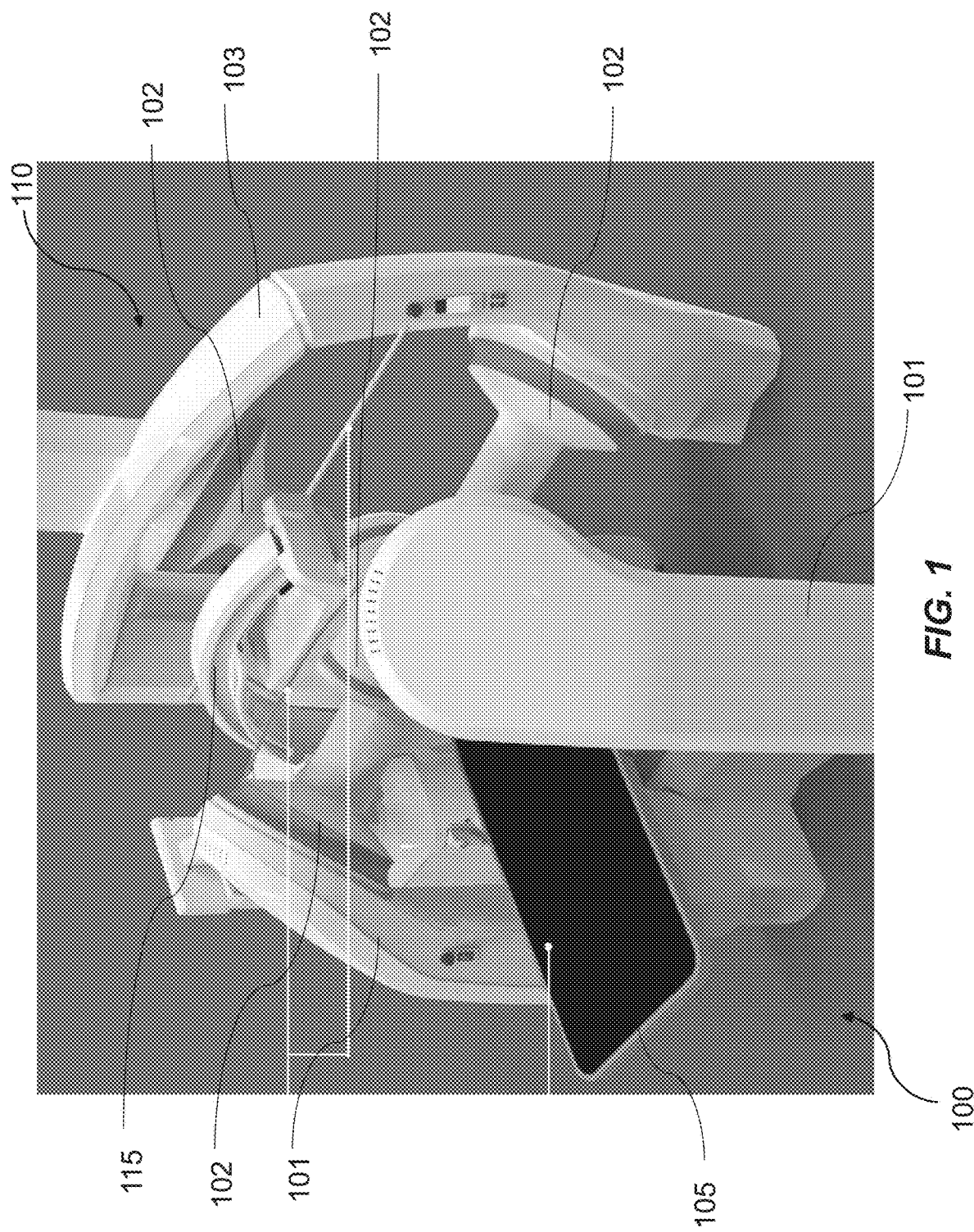
FIG. 1 is a drawing of a perspective view of an exemplary system for steering magnetotactic entities in accordance with the disclosed embodiments.
Figure 2:
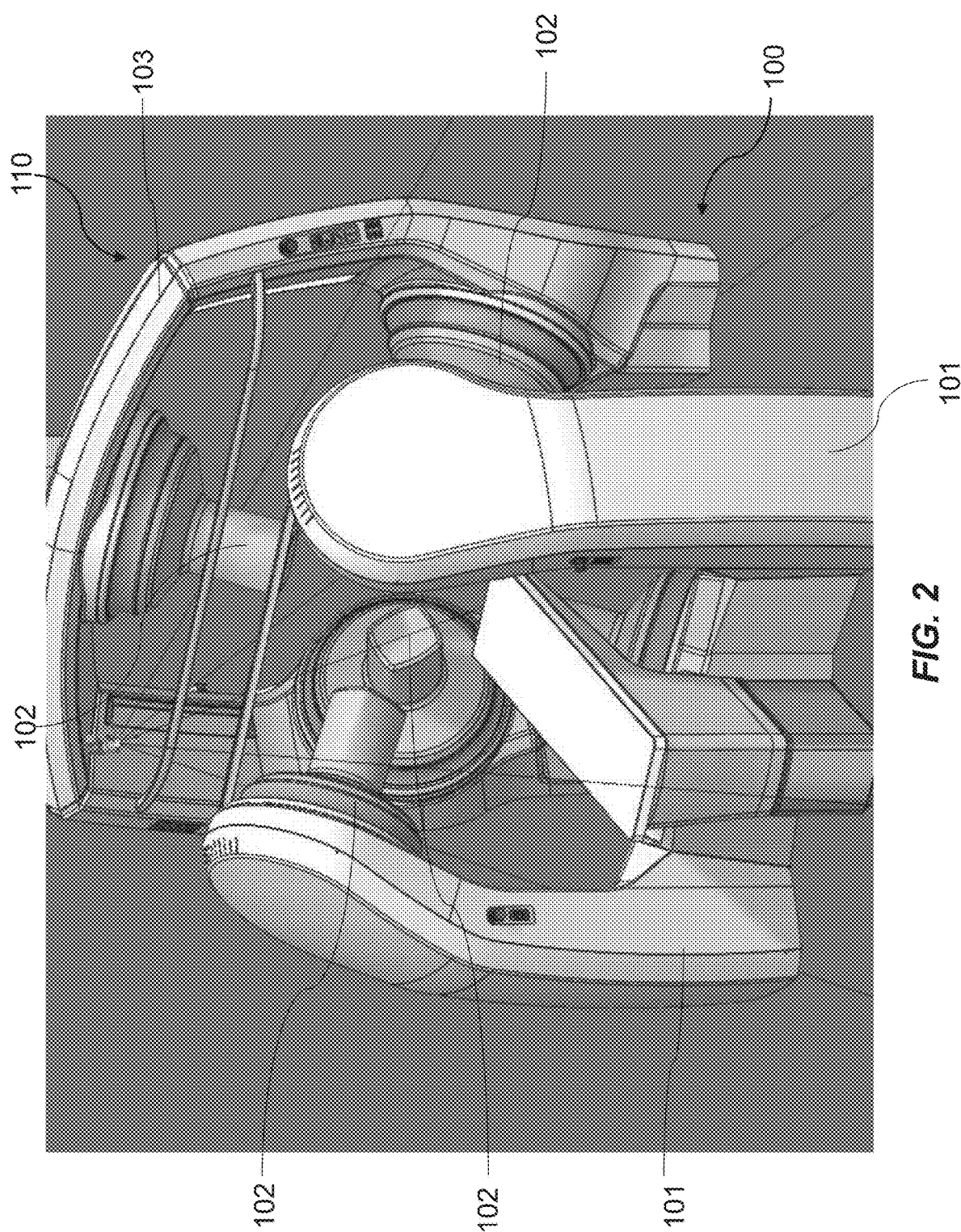
FIG. 2 is a drawing of a perspective view of the system of FIG. 1, without the table, showing the magnetic head that may be positioned under the table.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

The present disclosure relates to a system for steering magnetotactic entities in a subject, namely for the purposes of harnessing the magnetotactic entities for therapy, imagery, diagnostics, etc. For instance, a therapeutic agent, an imagery agent and/or a diagnostic agent may be linked to the magnetotactic entities, where the entities, once introduced into the subject (e.g. by injection), are steered towards, and may converge at, a targeted zone in the body of the subject, the magnetotactic entities steered by the magnetic field. As such, the present system enables the steering of these magnetotactic entities in a subject, once they have been introduced into the subject (e.g., by injection or otherwise). The injection may occur inside the target zone (e.g. intra-tumoral) or around the target zone (e.g. peritumoral).

The target zone may include one or more hypoxic zones, such as those resulting in a tumor. The target zone may include one or more hypoxic non-vascularized regions in the body of the subject resulting from or associated with, e.g., an ischemic stroke, pulmonary hypertension, ischemic cardiopathy, diabetic retinopathy, etc.

The magnetotaxis system employs a magnetic field mainly for directional control of magnetotactic entities (without inducing a displacement force to the entities). The fact that the magnetic field from the magnetotaxis system is only intended for directional control or steering and not to provide a propelling or pulling force (although a small if not negligible pulling force may be present close to the magnetic head), translates into the need for a much lower magnitude (intensity) of magnetic field which makes the navigation of magnetotactic entities technologically possible using much less power.

The system is configured to provide sufficient space (e.g. more than 1.5 meters between the centers of each of the support arms for a human) for the subject laid out on an operating table surrounded by the magnetic sources of the system. The space provided for the subject accommodates subjects of different sizes (such as a child or a fully-grown adult), where the size can also be dictated by the weight of the subject. As different medical interventions require that the subject adopt certain positions (e.g. for pelvic examination: on the subject's back with their legs angled and in the air; for an intervention at the pancreas: on the side with legs spread apart; the supine position, etc.), the space provided to accommodate the subject is also sufficient to set the subject in these different positions such that one or more members of the medical staff (e.g. physicians, nurses, technicians, etc.) can access the subject with little to no hindrance by the structure of the magnetotaxis system.

Definitions

In the present disclosure, by "medical intervention," it a meant a procedure performed on a subject for at least one of treatment (e.g., removal of a mass—tumor— through surgery), imaging (e.g., endoscopy, colonoscopy, optical coherence tomography, etc.) and diagnosis (which can involve one or more imaging techniques).

In the present disclosure, by "subject", it is meant mammals and non-mammals. Mammals mean any member of the mammalia class including, but not limited to, humans. Non-mammals include birds, reptiles, etc. The term "subject" should not bring on any limitations as to the sex or age. Even though the configuration of the system has been determined to accommodate a human subject adopting different intervention positions as explained herein, it will be understood that the present system can be used with non-human subjects (i.e. animals), without departing from the present teachings, provided that the animal can fit within the space defined by the structure of the system and there is sufficient room for the members of the medical staff (e.g. veterinarian; technician) to access the subject and/or circulate around the subject.

Exemplary System for Steering Magnetotactic Entities:

Reference is now made to FIG. 1, illustrating an exemplary system 100 for steering magnetotactic entities.

The system 100 includes a table 105, six magnetic heads 102 grouped in pairs, and a support structure 110 for supporting the magnetic heads 102 in a given configuration.

The system 100 may include an imaging device 115 such as an x-ray image intensifier such as a C-arm.

The magnetic heads 102 generate the magnetic field for steering the magnetotactic entities. As such, the magnetic heads 102 each have one or more magnetic coils surrounding a ferromagnetic core that generates a magnetic field when a current is passed therethrough. The magnetic heads 102 are paired together, thereby forming at least three pairs. Each of the pairs of magnetic heads 102 is defined by one axis of three axes that are orthogonal with one another. In embodiments, none of the three axes that define the orientation of the magnetic heads 102 is parallel with the floor, and none of the three axes is parallel with any of reference axes x, y and z (where the x-axis is parallel with the floor). The pairs of magnetic heads 102 may establish a point in a body of the subject where the magnetotactic entities will navigate towards and converge, using, for instance, the techniques described in U.S. Pat. No. 9,905,347. However, due to the size of the magnetic heads 102, the requirement of providing sufficient space to fit a subject amongst the magnetic heads 102 such that the convergence point or magnetic field generated by the magnetic heads 102 can be generated in the body of the subject, and to provide sufficient space to allow a physician to access the subject when lying on the table 105 (considering that the space occupied by the subject and physician may depend on the nature of the procedure to be performed on the subject, as explained herein), a support structure may be needed.

Support structure 110 supports each of the magnetic heads 102 in their given configuration where the magnetic heads of each pair of magnetic heads 102 are positioned in opposition to one another along an axis oriented orthogonally with respect to the axes of the other pairs of magnetic heads 102 for generating a magnetic field capable of steering the magnetotactic entities in three dimensions. The magnetic heads 102 of each pair of magnetic heads 102 are facing one another. The support structure 110 may include a support arch 103 and two support arms 101.

The support arch 103 and the two support arms 101 may be positioned at or near opposite ends of the table 105 such that the magnetic heads 102 supported thereby can be fixed in a proper orientation for generating the necessary magnetic field adapted for creating a torque along each of the three axes x, y and z.

Each of the support arms 101 may support one magnetic head 102 of a different pair of magnetic heads 102. The magnetic head 102 may be positioned at or near a top of the support arm 101. The support arm 101 may be shaped such that the support arm 101 is arched downward, or may have a vertical portion and a portion for receiving a magnetic head 102 that is at an angle with the vertical portion of the support arm 101, thereby orienting the magnetic head 102 at least slightly downward, towards the table 105. As such, the shape of the support 101 may be determined to position the magnetic head 102 attached thereto in a proper angle to face the corresponding other magnetic head 102 of the pair of magnetic heads 102. The orientation of the magnetic head 102 may be such that the magnetic head 102 supported by the support arm 101 is facing the corresponding magnetic head 102 of the magnetic head pair, as described herein. In some embodiments, each of the support arms 101 may be connected to one another at a base portion (e.g. joins the base of the table 105.) In other embodiments, each of the support arms 101 may be separate from the table 105.

In some examples, the support arms 101 may be configured to move away and towards the table 105, e.g. in order to create additional space for placing the patient on the table 105. For instance, the support arms 101 may be positioned on rails, where the support arms 101 may slide along the rails to create additional space.

In some examples, the magnetic heads 102 may be pivotably attached to the support arms 101 or the support arch 103, such that they may be displaced in order to further create space between the magnetic heads 102, e.g. for placing the patient on the table 105.

The support arch 103 may support one or more magnetic heads 102. As is shown in the example of FIG. 1, the support arch 103 supports three magnetic heads 102. A first magnetic head 102 supported by the support arch 103 is paired with a magnetic head 102 supported by the first support arm 101, a second magnetic head 102 supported by the support arch 103 is paired with a magnetic head 102 supported by a second support arm 102, and a third magnetic head 102 supported by the supper arch 103, centered on the support arch 103, is paired with the magnetic head 102 positioned under the table 105.

The support arch 103 has two leg portions, contacting the ground and that are substantially vertical (the leg portion may have a slight curve or bend as illustrated, for instance, in FIG. 1) and an arch portion that is curved, interconnecting the two leg portions of the support arch 103.

Each of the leg portions of the support arch 103 may receive one magnetic head 102. The magnetic head 102 may be located near or at the bottom of the leg portion of the support arch 103. The width or thickness of the leg portion of the support arch 103 may be greater towards the bottom in order to support the magnetic head 102 (e.g. may not be uniform). In some examples, the leg portion of the support arch 103 may include a user input interface for controlling the system (e.g. the generating of a magnetic field using the pairs of magnetic heads 102).

Figure 3:
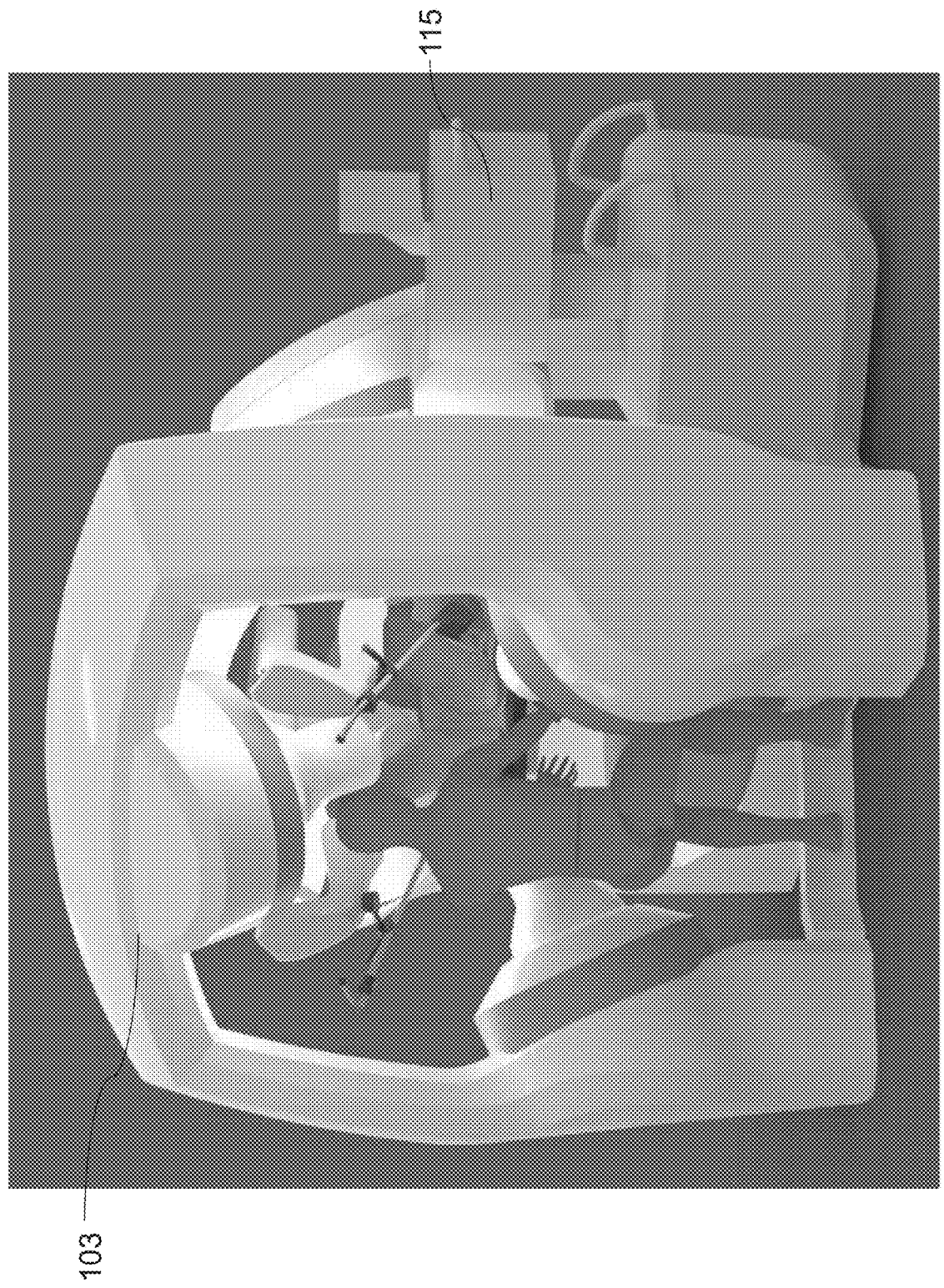
FIG. 3 is a drawing of perspective view of the system of FIG. 1, where a subject is laid on the table with its legs positioned for a medical intervention in the pelvis (such as rectal cancer, prostate cancer, interventions in the genital organs, etc.), and where a doctor is positioned under the exemplary support arch of the system, treating the subject.
Figure 4:
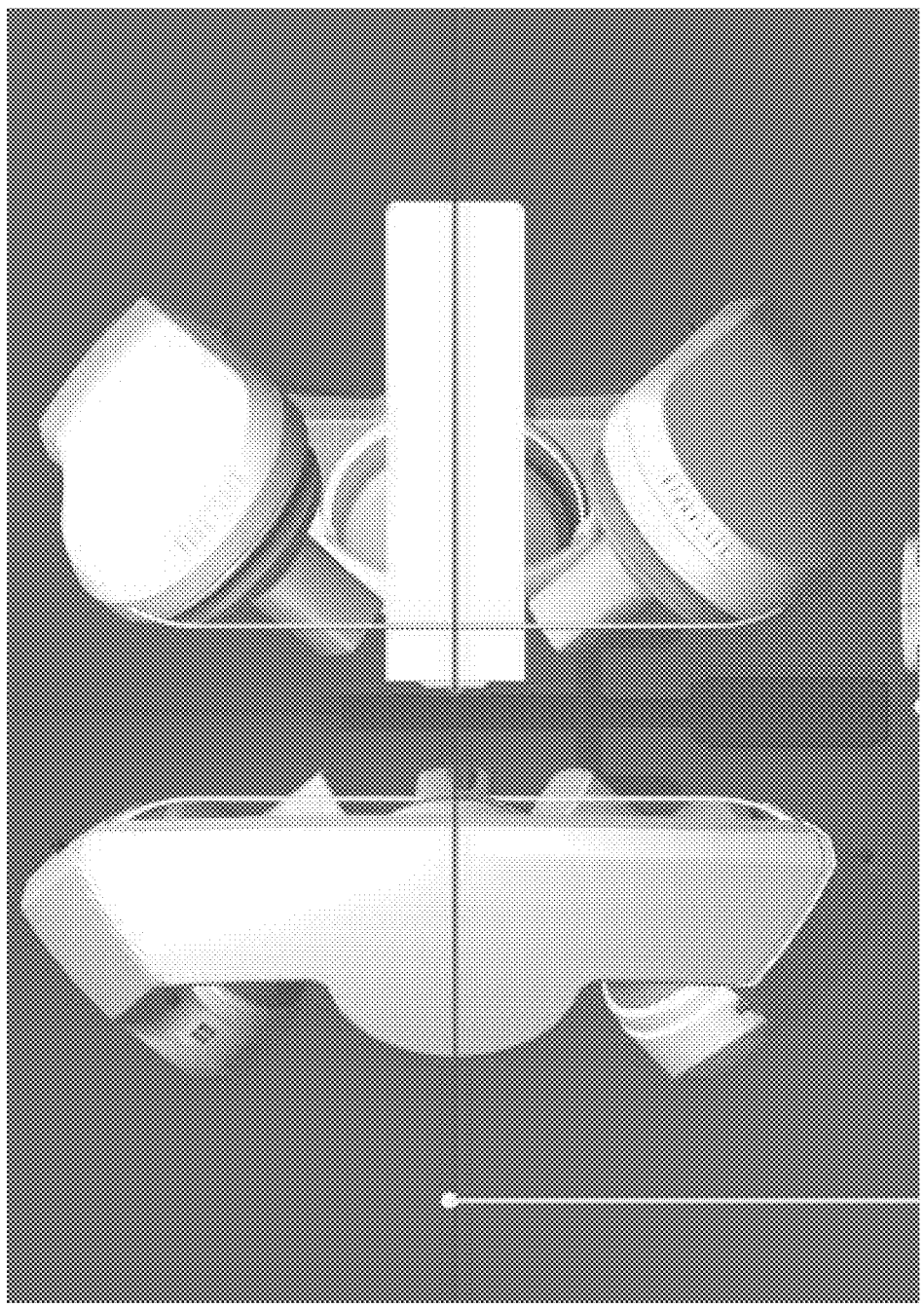
FIG. 4 is a drawing of a top-down view of the system of FIG. 1 without the imaging device.
Figure 5:
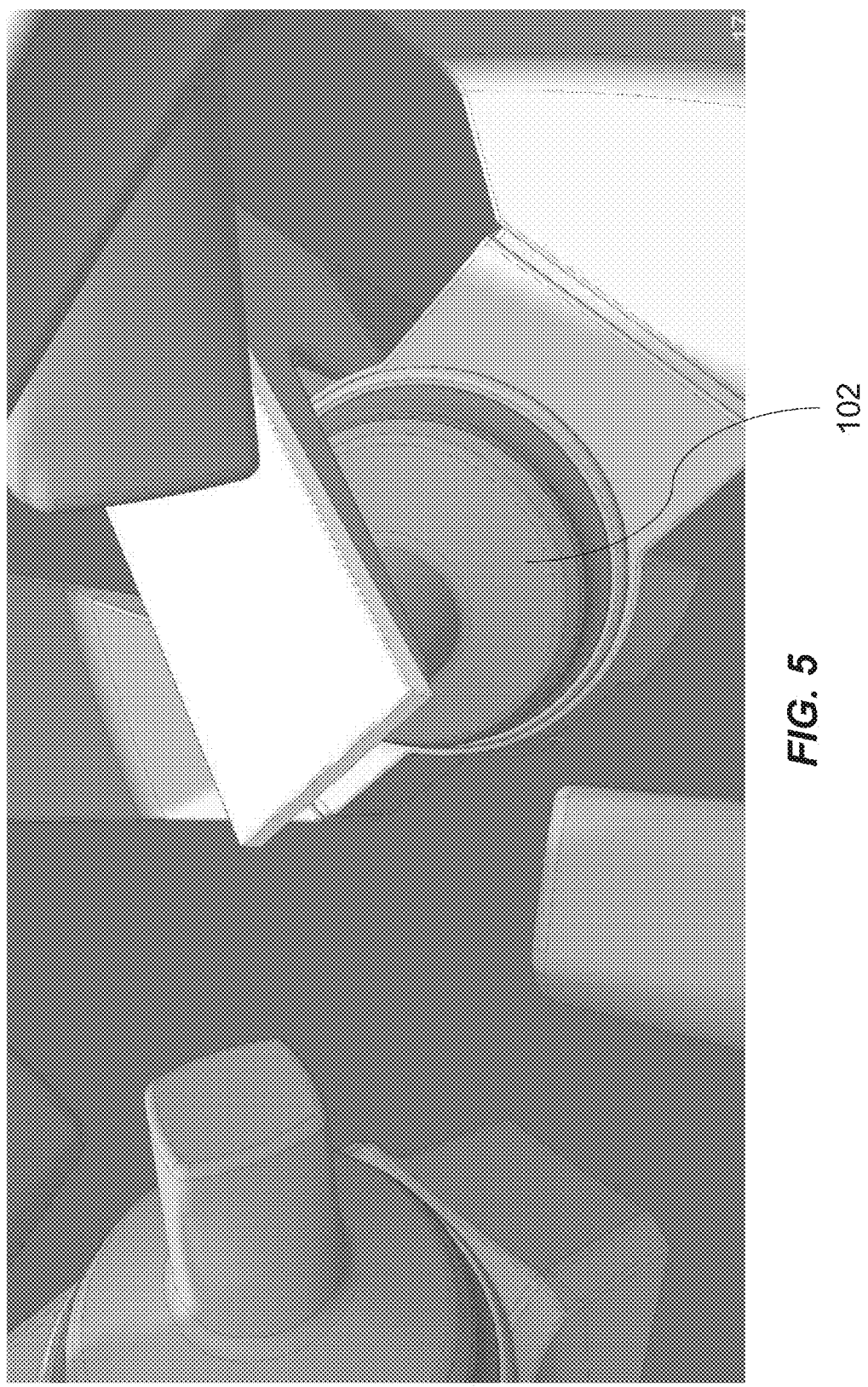
FIG. 5 is a drawing of a close-up of the magnetic head of the system of FIG. 1 that is to be located under the table of the system of FIG. 1.

The arch portion of the support arch 103 creates a space as a result of the elevation of the middle of the arch for an intervening physician to access the subject, as shown in FIG. 3.

In some examples, instead of a pair of support arms 101, the system 100 may include a second support arch for receiving the two magnetic heads 102 instead of the support arms 101 (not shown).

It will be understood that the orientation and position of the magnetic heads 102 shown in FIGS. 1-5 illustrate one example of same that was developed for meeting the size constraints and to generate sufficient space for the subject and intervening members of medical staff to perform certain medical interventions, as described herein, where certain medical interventions require that the subject be laid in a given position.

The table 105 is adapted to receive the subject into whom will be introduced the magnetotactic entities. As such, the length of the table 105 may be sufficient to receive one of possible subjects of different heights and widths lying down (e.g. over 6.5 feet). The table 105 may be adapted to move back-and-forth, side-to-side and/or up-and-down (i.e. along one or more of the three axes x, y, and z). In some embodiments, the table 105 may also be configured to rotate clockwise and/or counter-clockwise. The movement of the table 105 may be controlled by a user using a user input interface, such as the one appearing on the leg portion of the support arch 103 in FIG. 1. In other embodiments, the system 100 may be controlled remotely (e.g. using a remote control that communicates wirelessly with the system 100; a computing device such as a tablet computer or smartphone including program code for controlling the system 100 when executed by the processor of the computing device, etc.)

The table 105 may be layered with a thin mattress or cushion to provide comfort for the subject. In some examples, the table 105 may have extensions for receiving the arms of the subject.

The imaging device 115 is configured to obtain information on the anatomy of the subject (imaging of the inside of the subject). In some embodiments, this information may be used to monitor the progress of the magnetotactic entities in the subject, determine the location of the target site towards which the magnetotactic entities will be steered, to provide visuals for the purpose of a medical intervention such as a surgery, etc. The imaging device 115 may be an X-ray image intensifier, such as a C-arm. However, it will be understood that other imaging devices may be used without departing from the present teachings.

In some examples, as shown in FIG. 1, the imaging device 115 may fit in a space between the support arm 101 and the support arch 103. When the imaging device 115 is a C-arm, the arch of the C-arm may arch around the table 105 such that the C-arm can gather information on the subject lying on the table 105, where, e.g., the table 105 may move up and down with respect to the C-arm such that the C-arm can provide imaging data along a length of a body of the subject. In some embodiments, the imaging device 115 may be displaced manually or remotely, having, for instance, a pair of wheels for rolling the imaging device 115 into different positions.

Figure 11:
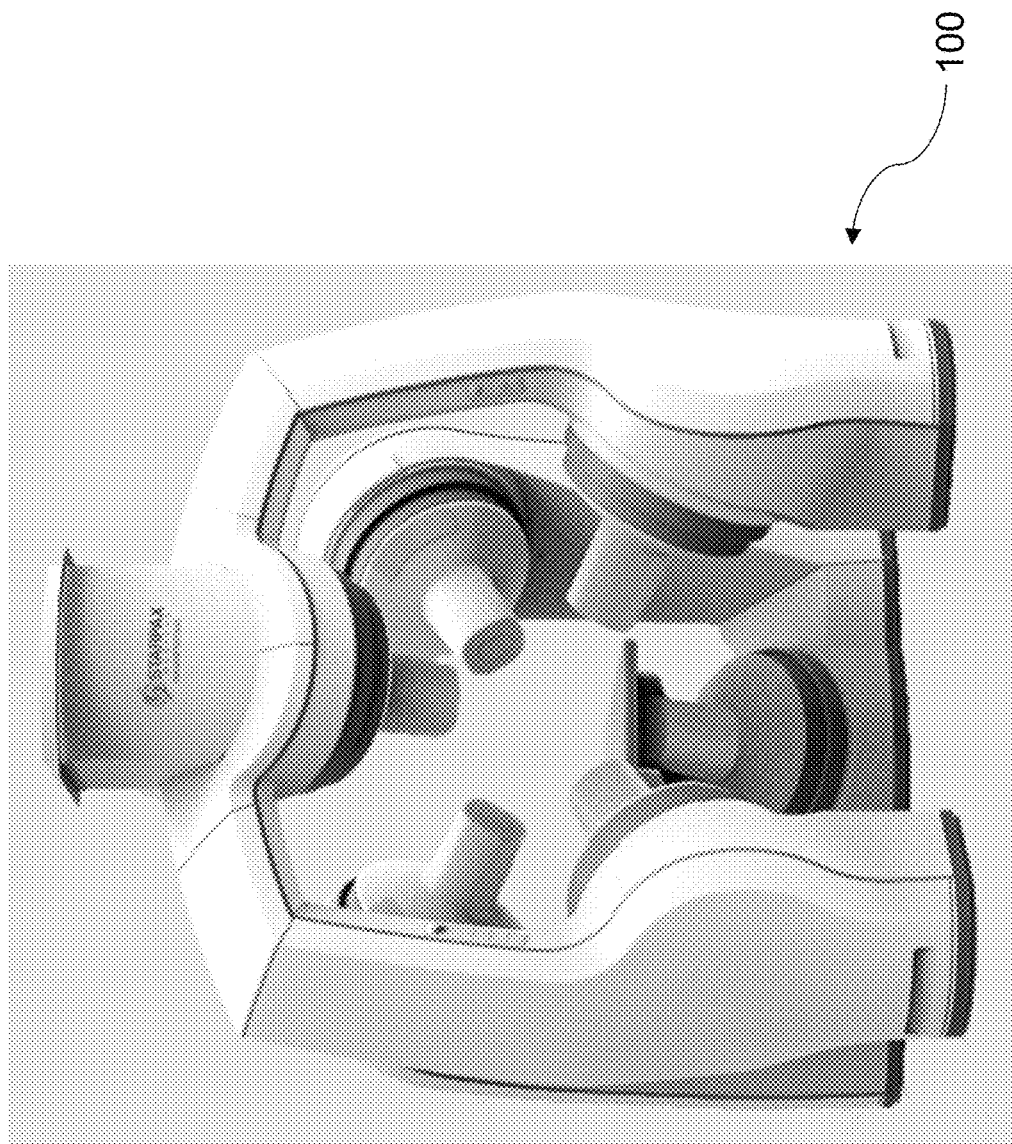
FIG. 11 is a drawing of a front view of another exemplary system for steering magnetotactic entities in accordance with the disclosed embodiments.

FIG. 11 illustrates another exemplary design of the system 100 of FIG. 1.

Reference will now be made to FIG. 3 to further illustrate an exemplary system for steering magnetotactic entities as described herein. The layout of the system 100 may be dictated by the size of the magnetic heads 102, the positioning on the surface to receive a subject such that the pairs of magnetic heads 102 may generate a magnetic field for steering magnetotactic entities introduced into the subject, and finally to allow a physician to have access to the subject in order to conduct a medical intervention.

In some embodiments, the dimensions of the support arch 103, the orientation of the leg portions of the support arch 103 and the orientation of the magnetic heads 102 fixed thereon are to allow access to a physician to fit within the space defined by the arch 103. Moreover, for certain medical procedures, the position of the subject may result in the subject occupying more space. For instance, for a medical intervention pertaining to rectal cancer, the subject's legs are suspended and spread open as illustrated in FIG. 3. As such, the layout of the system 100 takes into account the space occupied by the subject and the physician during different medical procedures, and more particularly with respect to those where the subject occupies a greater amount of space due to the position of the subject. The magnetic head 102 positioned at the top of the support arch 103 faces towards the table 105, and mirroring the orientation of the magnetic head 102 positioned under the table 102. By having the magnetic head 102 positioned at the center of the support arch 103 be oriented towards the table 105, thereby not being entirely vertical, this provides sufficient space far a seated physician to be positioned under the support arch 103, the angled magnetic head 102 providing more space under the support arch 103.

The leg portions of the support arch 103 are not parallel, e.g. may define an angle of 90 degrees or less with respect to one another.

In some examples, for treating breast cancer, the system 100 is adapted to generate a target zone near or at the breast while the subject is lying on the table 105. This may be further achieved by having the table 105 move up and/or down in order to reposition the subject with respect to the magnetic heads 102.

Reference is made to Table 1, illustrating an exemplary list of possible positions of a human subject associated with different body parts that are subject to medical interventions that may be performed on the subject. The configuration of the system 100 (e.g. the space surrounding the table 105) is to provide sufficient space for the subject laid in one of those positions, and for the members of the medical staff to carry out the necessary interventions. The space may also be for accommodating the subject as the subject is shifted between positions during the medical intervention:

TABLE 1 list of exemplary parts of a human subject's body that can be subject to a medical intervention and that were taken in account in the layout of an exemplary system for steering magnetotactic entities.

| Location of body | Exemplary possible targets in the subject | Position of the subject on the table | Position of the member of the medical staff | Possible instruments used | Additional information to consider for space requirements |
|---|---|---|---|---|---|
| Head and neck | Tongue, larynx, throat, salivary glands, oesophagus, ear | Laying on back with immobilized head | Standing next to head of subject | Ultrasound device, suction device, injection syringe | The member of medical staff may have to turn around the head of the subject |
| Pelvis | Anus, rectum | Laying on back, legs spread in the air | Sitting and facing the subject's pelvis | Ultrasound device, rectoscope, injection syringe, stabilizer balloon | The subject's legs may be moved to a horizontal and parallel position during an intervention |
| Pancreas | Pancreas | Laying on back, legs spread in the air | Sitting next to upper part of the subject's body with a nurse positioned next to the bottom part of the subject's body | A device for both ultrasound and endoscopy, injection syringe, catheter | The pancreas provides for difficult access being behind the stomach |
| Breast | Breast | Laying on back, body | Standing next to the | Ultrasound, injection | The breast may have to be |

TABLE 1-continued list of exemplary parts of a human subject's body that can be subject to a medical intervention and that were taken in account in the layout of an exemplary system for steering magnetotactic entities.

| Location of body | Exemplary possible targets in the subject | Position of the subject on the table | Position of the member of the medical staff | Possible instruments used | Additional information to consider for space requirements |
|---|---|---|---|---|---|
| | | can shift from left to right of the table, where the body may not be in the middle of the table | subject | syringe, catheter | significantly manipulated by the physician during the intervention due to the mobility of the breast |
| Colon | Caecum, ascending colon, descending colon, transversal colon, sigmoid colon | Laying on side or on the back | Standing and facing the back of subject (when subject is lying on their side) | Colonoscope, injection syringe | Due to the size of the colon, the position of the subject depending on the point of intervention may vary |

As illustrated by the examples of Table 1, depending on the nature of the intervention, the subject and the intervening members of the medical staff take up varying amounts of space. The layout of the system is configured to provide for the space occupied by the members of the medical staff. This is because the system 100 can be used to prepare for, and/or for use with, many possible medical interventions.

In an exemplary embodiment, the distance between the first and second support arms 101, measured from their respective centers at their base, may be of 1698 mm. The table 105 may be position at the midpoint between the first and second support arms 101. An exemplary support arch 103 may have a height of 2540 mm, a width of 1593 mm measured from the respective centers of the base of the leg portions of the support arch 103. It will be understood that other possible dimensions may be possible without departing from the present teachings.

Figure 6:
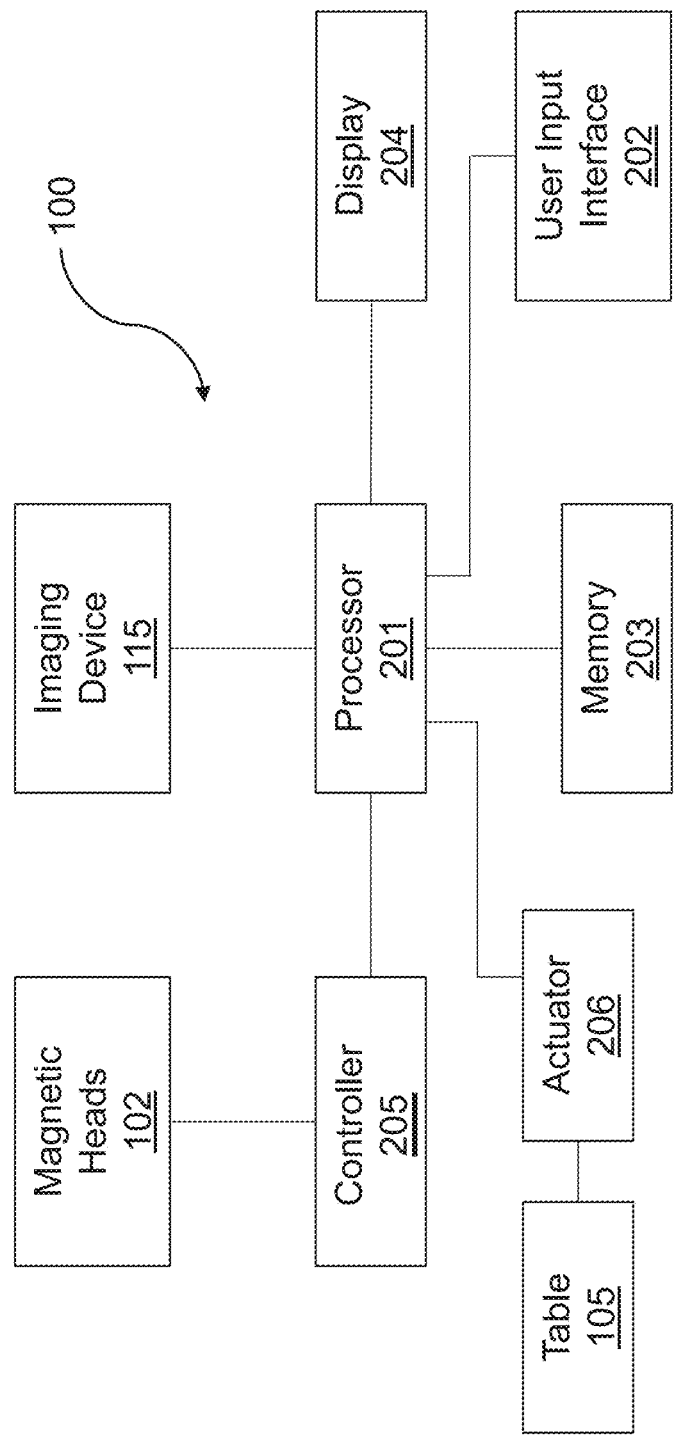
FIG. 6 is a block diagram of an exemplary system for steering magnetotactic entities.

Exemplary Computer Architecture of an Exemplary System for Controlling Magnetotactic Entities:

Reference is now made to FIG. 6, illustrating an exemplary computer architecture of an exemplary system for controlling magnetotactic entities 100, interacting with certain of the components of the system 100.

The system 100 includes a processor 201, memory 203 (e.g. on a printed circuit board—PCB) and a controller 205 (e.g. including a current amplifier).

The system 100 may include a user input interface 202 and/or a display 204. The computer may include an actuator 206.

The processor 201 may be a programmable processor. In this example, the processor 201 is shown as being unitary, but the processor may also be multicore, or distributed (e.g. a multi-processor).

The computer readable memory 203 stores program instructions and data used by the processor 201. The memory 203 may include non-transitory storage to store the program instructions. The computer readable memory 203, though shown as unitary for simplicity in the present example, may comprise multiple memory modules and/or caching. In particular, it may comprise several layers of memory such as a hard drive, external drive (e.g. SD card storage) or the like and a random access memory (RAM) module. The RAM module may store data and/or program code currently being, recently being, or soon to be processed by the processor 201 as well as cache data and/or program code retrieved from non-transitory memory, e.g., a hard drive. A hard drive may store program code and be accessed to retrieve such code for execution by the processor 201 and may be accessed by the processor 201 to store magnetic head 102 sequences for generating a convergence point for the magnetotactic entities, and imaging data from the imaging device 115, as explained herein. The memory 203 may have a recycling architecture for storing, for instance, imaging data from the imaging device 115, coordinates for steering the magnetotactic entities, etc., where older data files are deleted when the memory 203 is full or near being full, or after the older data files have been stored in memory 203 for a certain time.

The user input interface 202 is in communication with the processor 201. The user input interface 202 allows for a user to provide input to the system 100, e.g., for controlling the magnetic heads 102, moving the table 105, activating the imaging device 115. The user input interface 202 may be one or more of a touchscreen, one or more knobs, a keyboard, a mouse, a joystick, etc. As shown in FIG. 1, the user input interface 202 may be integrated to a leg portion of the support arch 103 (however, the user input interface 202 may be separate from the support arch 103 or support structure 110, or may be integrated, e.g., to a support arm 101).

The processor 201, the memory 203 and the user input interface 202 may be linked via BUS connections.

The display 204 provides visual information to the user of the system 100, such as imaging data generated by the imaging device 115, values for the strength of the magnetic field generated by one or more pairs of magnetic heads 102, the location of the convergence point for steering the magnetotactic entities, overlaid, e.g., over an image of the subject generated by, for instance, the imaging device 115. The display 204 may also provide a graphical user interface for the user for controlling the system 100. The display 204 may also include a functionality of a user input interface 202, being configured as a touchscreen.

The one or more actuators 206 controls the position of the table 105. The one or more actuators 206, upon receiving commands from the processor 201, may cause the table to move up-or-down, side-to-side, forwards-or-backwards, or rotate. The one or more actuators 206 may be any combination of pneumatic, hydraulic, supercoiled, electric, rotary, linear, etc.

One or more controllers 205 (e.g. including current amplifiers) may be present for controlling the flow of current to the one or more magnetic heads 102, in order to cause the generation, or modifying the generation of the magnetic field generated by the one or more magnetic heads 102 when powered, as described in further detail below.

The user may control the system 100 by providing input via the user input interface 202. For instance, the user may provide input for activating one or more of the magnetic head pairs (or this may be done implicitly by the user designating a target in the subject). The processor 201 receives the input for turning on one or more of the magnetic heads, and sends commands to cause the controller 205 to open one or more switches and/or modulate current being directed to the one or more magnetic head pairs (e.g. through current amplifiers), as described in further detail below. In some embodiments, where the user provides a target for steering the magnetotactic entities, the processor 201 may retrieve from memory 203 one or more commands or functions to identify the appropriate magnetic head pairs 102 to turn on, the appropriate current to be provided to the one or more magnetic heads, and/or if the current is to remain constant, and/or if the magnetic field generated by each of the magnetic heads 102 is to remain constant or is to fluctuate in a time multiplexed manner, as explained in U.S. Pat. No. 9,905,347. In some embodiments, upon the user selecting a target in a subject for the steering of the magnetotactic entities, the processor 201 may also generate one or more commands transmitted to the actuator 206 in order to displace the table 105, and the user positioned thereon, for positioning the subject with respect to the convergence point that may be generated by the pairs of magnetic heads 102.

The user may also provide input via the user input interface 202 to displace the table 105. This input is received by the processor 201, where the processor 201 retrieves from memory 203 commands or functions to calculate table adjustment(s) and sends commands corresponding to the user input to the actuator 206 to cause the table 105 to be displaced.

The user input interface 202, processor 201 and memory 203 may be used to control the imaging device 115. However, in some embodiments, the imaging device 115 may have a separate computer, including a user input interface, for interacting with same.

Figure 7:
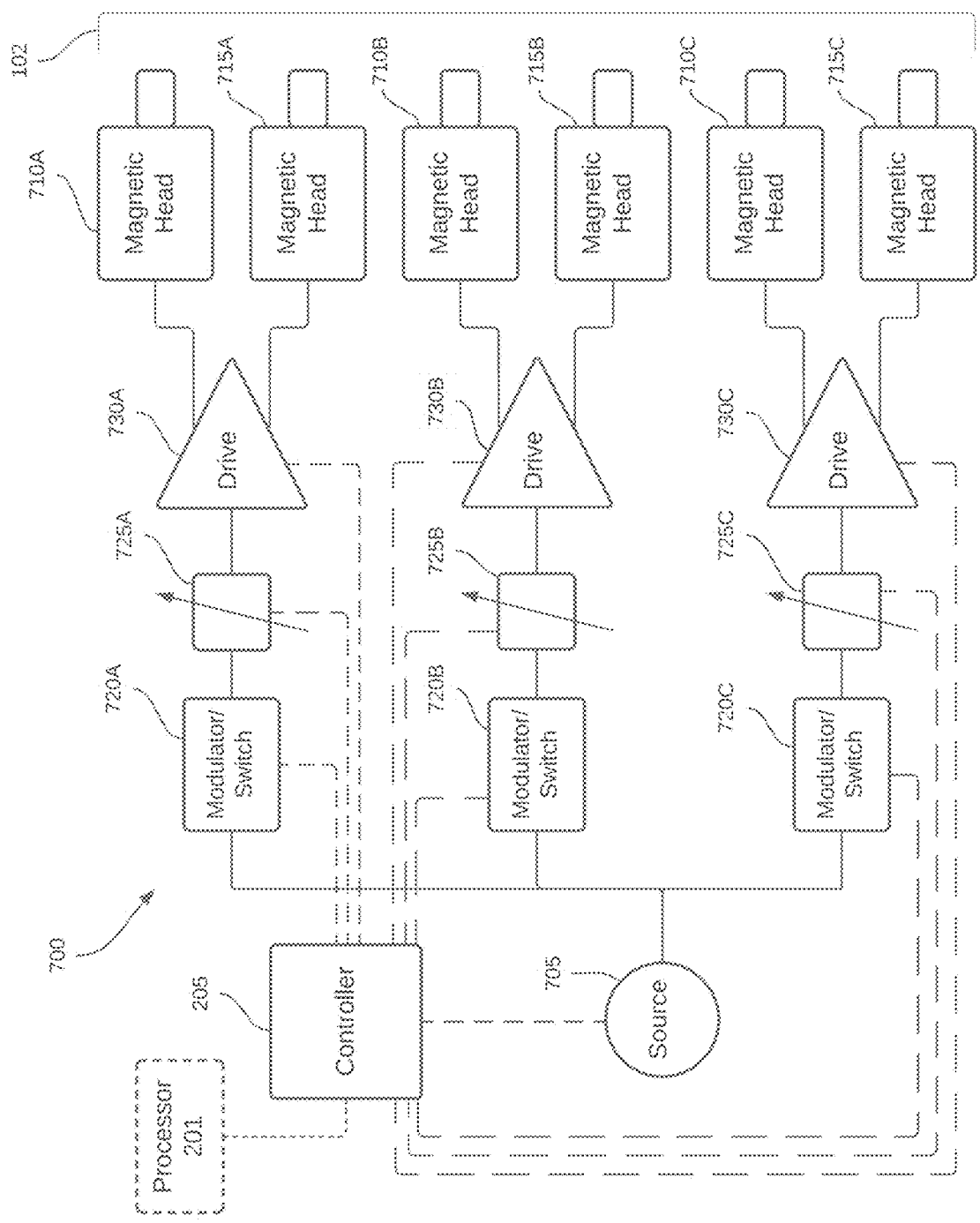
FIG. 7 is an electric schematic of electrical components of an exemplary system for steering magnetotactic entities in a subject.

FIG. 7 depicts a controller 205 in communication with the components of a magnetic head subsystem 700. As explained above, the controller 205 is in communication with the processor 201 (see FIG. 6). The processor 201 sends commands to the controller 205 and may receive various types of data from the controller 205 relating to the state of the components of the magnetic head subsystem. The controller 205 controls the components of the magnetic head subsystem 700 to provide drive signals to the magnetic heads 102.

The magnetic heads 102 may be configured as three pairs of opposing heads, each pair aligned along one of three orthogonal axes. For example, a first pair of opposing magnetic heads (710A, 710B) may be positioned along a first axis, a second pair of opposing magnetic heads (715A, 715B) may be aligned along a second axis, and a third pair of opposing magnetic heads (720A, 720B) may be aligned along a third axis.

The magnetic head subsystem 700 includes a source 705, e.g., a radio frequency oscillator, to provide current to the magnetic heads 102. The output of the source 705 may be fed to a number of drive component chains, each of which may include a modulator/switch (720A, 720B, 720C), a phase shifter (725A, 725B, 725C), and a drive (730A, 730B, 730C). In disclosed embodiments, there may be a separate source 705 for one or more of the drive component chains, e.g., a separate source for each drive component chain.

In the example depicted, each pair of magnetic heads (e.g., 710A, 715A) has an associated chain of drive components (e.g., 720A, 725A, 730A). In disclosed embodiments, a full chain of drive components may be provided for only a subset of the pairs of magnetic heads. For example, if only two of the three pairs of magnetic heads are to receive modulated signals, then the drive (e.g., 730C) of the third pair of magnetic heads (e.g., 710C, 715C) could be in communication with the source 705 without an intervening modulator/switch (e.g., 720C). Similarly, in disclosed embodiments, the phase shifter (e.g., 725C) may be omitted from a respective drive component chain if the corresponding pair of magnetic heads (e.g., 710C, 715C) does not require a phase-shifted signal at the input of the drive (e.g., 730C).

The modulator/switch (720A, 720B, 720C) receives the output of the source 705 and performs modulation or switching to generate a desired waveform, e.g., a square-wave or pulsed waveform. One of ordinary skill in the art would understand that a modulator can be implemented with various circuit architectures, including in a form that is, in essence, a switch. Hence, the terms "modulator/switch," "modulator," and "switch" are used interchangeably in the present specification, including the claims. The output of the modulator/switch (720A, 720B, 720C) is received by a phase shifter (725A, 725B, 725C), which applies a determined phase shift to the drive signal, e.g., by applying a delay to the signal. In this example, the phase shifter (725A, 725B, 725C) is depicted as a separate component. However, one of ordinary skill in the art would understand that a phase shift could instead be provided by another component, such as the modulator/switch.

Each drive component chain includes a drive (e.g., 730A) which outputs a drive current to a pair of the magnetic heads (e.g., 710A, 715A). The drive (e.g., 730A) receives a drive signal from the source 705—possibly after passing through a modulator/switch (e.g., 720A) and/or a phase shifter (e.g., 725A). The drive (730A, 730B, 730C) may be, for example, an amplifier which amplifies a received drive signal to generate a high power drive current (or voltage) to drive a pair of the magnetic heads. In disclosed embodiments, the drive (e.g., 730A) may output drive currents of opposite polarity to respective ones of the pair of magnetic heads (e.g., 710A, 715A). One of ordinary skill in the art would understand that a separate drive may be used for each magnetic head.

Figure 8:
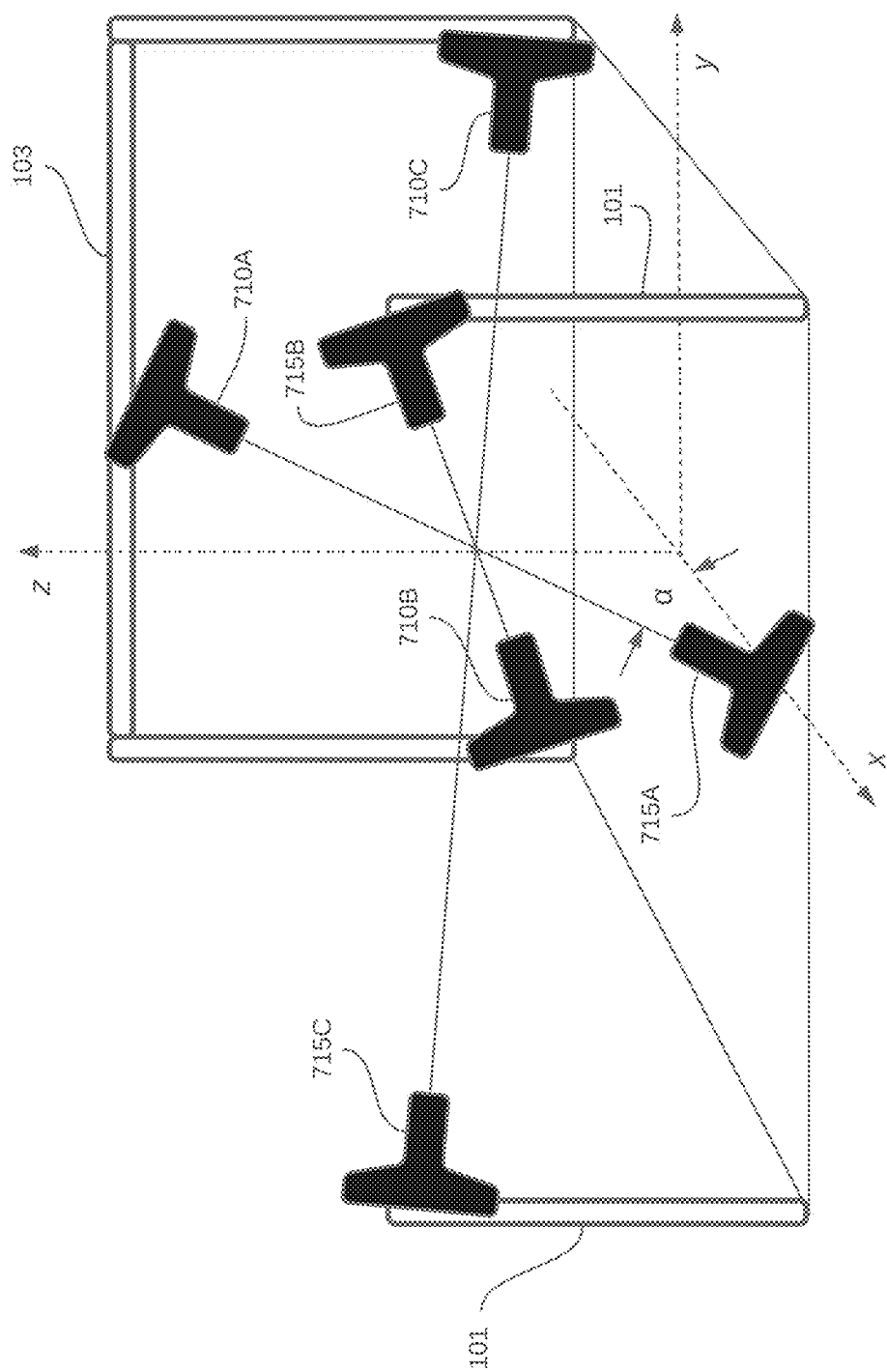
FIG. 8 is a schematic of exemplary positions of the magnetic heads with respect to one another.

FIG. 8 depicts a geometric relationship of positions and orientations of the magnetic heads. As discussed above, the system 100 may include three pairs of magnetic heads (710A-C, 715A-C). The magnetic heads 102 of each pair of magnetic heads may be positioned opposed to each other (i.e., facing each other) along a particular one of three substantially orthogonal axes. By the term "substantially orthogonal" it is meant that the axes need not be precisely orthogonal—the system 100 can be calibrated for axes which vary somewhat (e.g., +/−5% or +/−10%) from orthogonality.

The magnetic heads (710A-C, 715A-C) are held in position by the support arms 101 or the support arch 103 or positioned on the floor, i.e., under the table 105 (see FIG. 1). In the example depicted, a first pair of magnetic heads (710A, 715A) is positioned such that a first magnetic head 710A is affixed to the support arch 103, while the second, opposing magnetic head 715A is affixed to the floor or to a base in contact with the floor. A second pair of magnetic heads (710B, 715B) is positioned such that a first magnetic head 710B is affixed to the lower portion of one of the legs of the support arch 103, while the second, opposing magnetic head 715B is affixed to one of the support arms 101. Similarly, a third pair of magnetic heads (710C, 715C) is positioned such that a first magnetic head 710C is affixed to the lower portion of the other leg of the support arch 103, while the second, opposing magnetic head 715C is affixed to the other support arm 101.

As a reference, a set of orthogonal axes may be defined relative to the plane of the floor, with the x-axis running along the floor in a direction away from the support arch 103 and toward a mid-point between the support arms 101, i.e., from the head to the foot of the table 105 (see FIG. 1), the y-axis running along the floor in a direction perpendicular to the x-axis, and the z-axis running in a vertical direction toward the ceiling. In the example depicted, none of the first, second, or third axes of the pairs of magnetic heads (710A-C, 715A-C) is orthogonal to the x, y, or z axes.

Specifically, the second magnetic head 715A of the first pair of magnetic heads (710A, 715B) is positioned to form an angle, $\alpha$, with respect to the x-axis (i.e., with respect to the plane of the floor), where a is less than 90°. In some examples, a may be 54 degrees. As such, the axis of the first pair of magnetic heads (710A, 715A) forms an angle of 90°-$\alpha$ with the z-axis (i.e., the vertical axis). The axis of the second pair of magnetic heads (710B, 715B) extends from one of the support arms 101 to the lower portion of a leg of the support arch 103 and, thus, is not parallel to the x or y axes (or the z-axis) and, consequently, is not parallel or perpendicular to the table 105 (see FIG. 1). In some embodiments, $\theta$ may be around 25 degrees (e.g. 23.9 degrees). Similarly, the axis of the third pair of magnetic heads (710C, 715C) extends from the other support arm 101 to the lower portion of the other leg of the support arch 103 and, thus, is not parallel to the x or y axes (or the z-axis) and, consequently, is not parallel or perpendicular to the table 105 (see FIG. 1). In some embodiments, $\beta$ may be equal to $\theta$ (e.g. around 25 degrees, such as 23.9 degrees).

By virtue of the geometric relationship described above, it can be seen that the first magnetic head 710A of the first pair of magnetic heads (710A, 715A) is not directly over the center of the table 105 (see FIG. 1) where it would interfere with positioning of a subject on the table 105. Furthermore, the arrangement of the second pair of magnetic heads (710B, 715B) and third pair of magnetic heads (710C, 715C) is such that they are not positioned at the head or the foot of the table 105 (see FIG. 1) where they would interfere with access to the subject by a physician. Moreover, the second pair of magnetic heads (710B, 715B) and third pair of magnetic heads (710C, 715C) are displaced vertically (i.e., above or below) relative to the level of the table 105 (see FIG. 1). The geometric relationship also allows for three of the six magnetic heads to be mounted on the support arch 103 and two of the magnetic heads to be mounted on two respective support arms 101, which reduces the complexity of the support structure.

Figure 9:
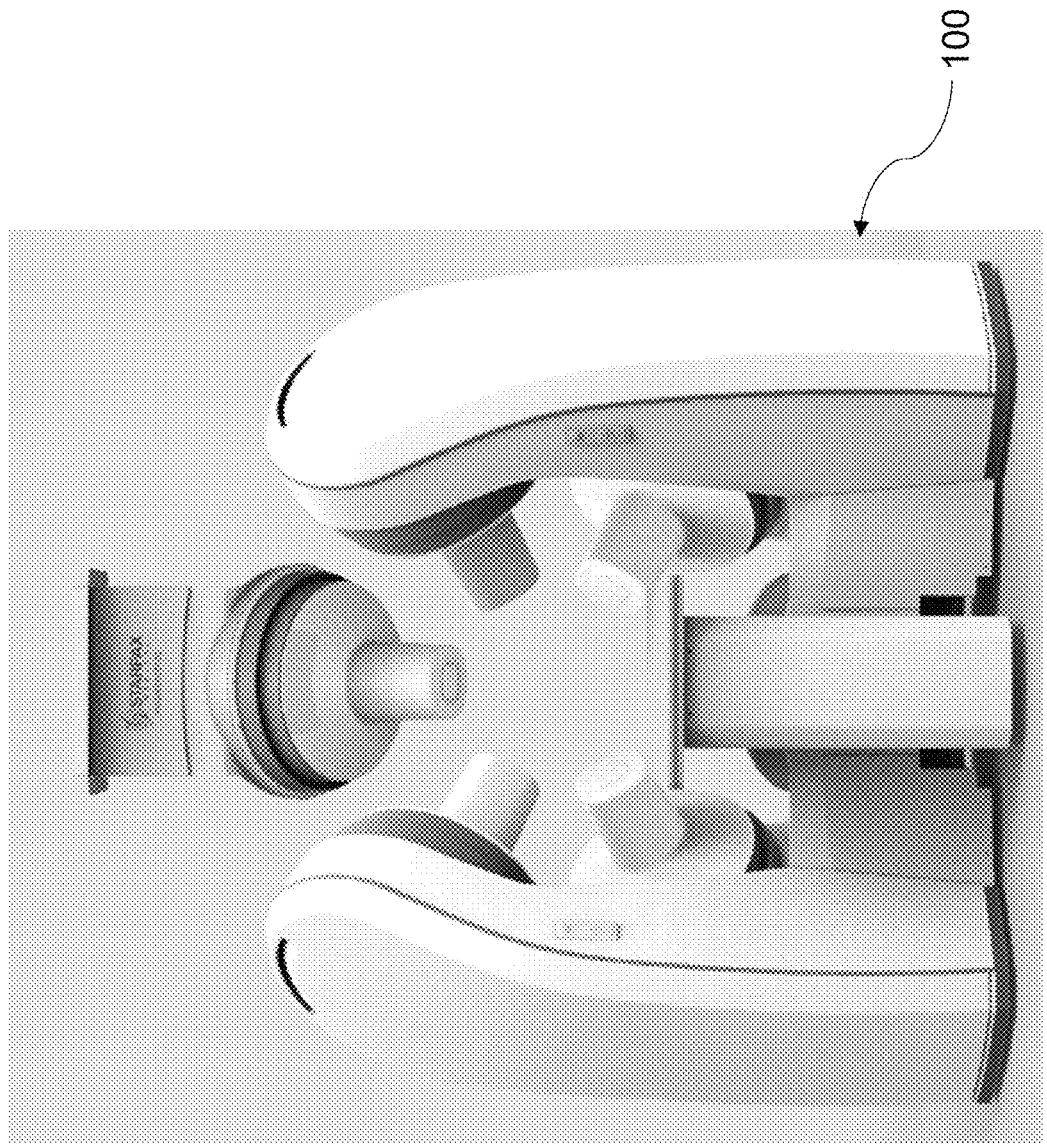
FIG. 9 is a drawing of a front view of another exemplary system for steering magnetotactic entities in accordance with the disclosed embodiments.
Figure 10:
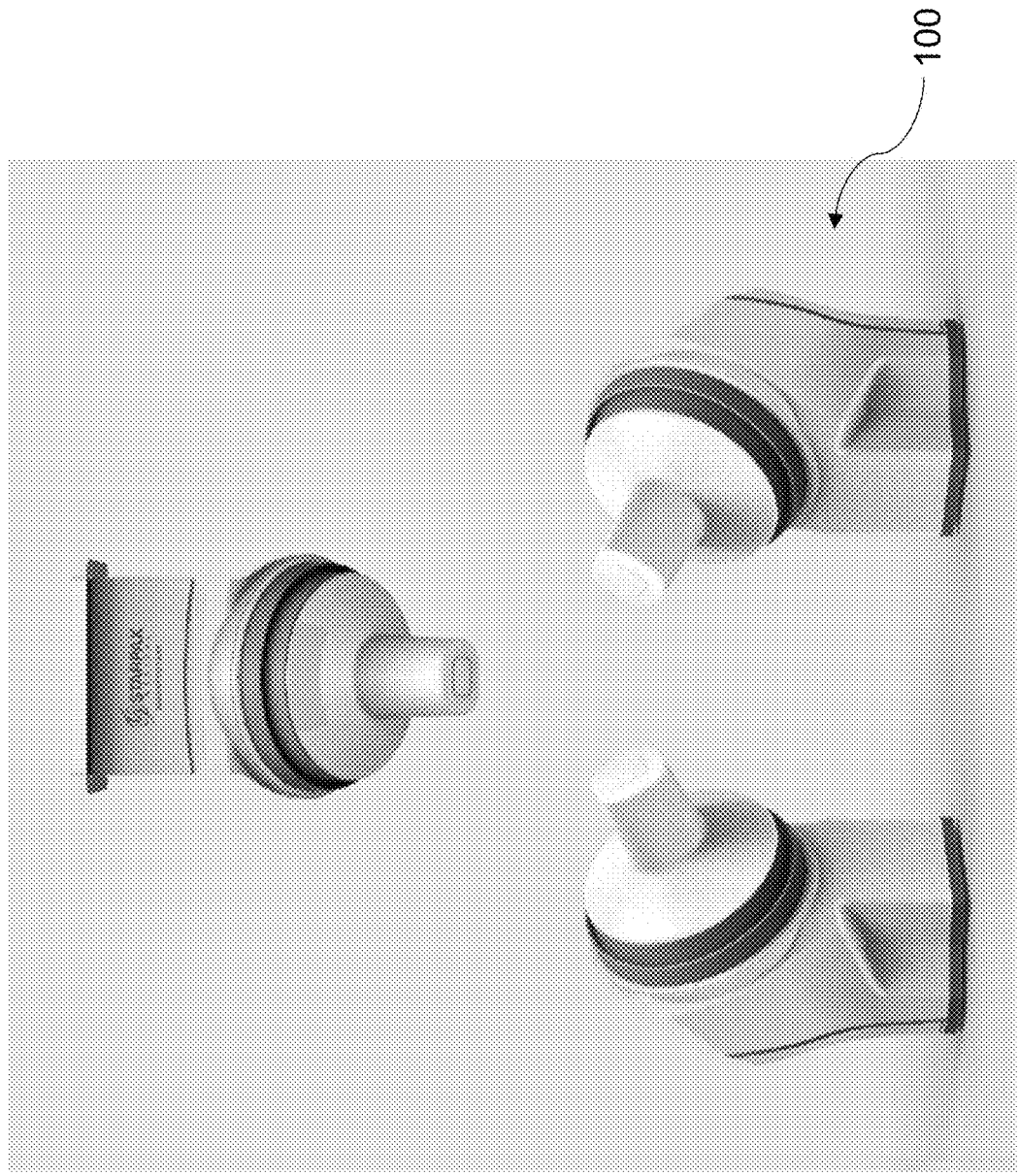
FIG. 10 is a drawing of a front view of the exemplary system of FIG. 9 for steering magnetotactic entities in accordance with the disclosed embodiments.

In some embodiments, as shown in FIGS. 9 and 10, the floor, ceiling and/or walls of the room in which the system 100 is located may be used to support one or more of the magnetic heads, where the magnetic heads are positioned with respect to one another in a similar manner as described in FIG. 8. As such, as shown in FIG. 9, as one of the magnetic heads is joined to the ceiling, and two of the magnetic heads are joined to the floor, the exemplary system 100 of FIG. 9 does not include the arch for providing support to these three magnetic heads, as the ceiling and floor replace the arch for providing support. FIG. 10 shows the three magnetic heads of FIG. 9 that were joined to an arch in FIG. 1, where two of the three magnetic heads are joined to the floor, and one of the three magnetic heads is joined to the ceiling. Necessary wiring for the system, including the magnetic heads, may respectively be passed on or under the floor, and on or in the ceiling. Similarly, in some examples, walls may also be used to support the magnetic heads that were joined to the support arms in FIG. 1, thereby replacing the support arms as mechanisms for supporting the magnetic heads (not shown).

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. The application has been amended as follows:
   system for steering magnetotactic entities in a subject, the magnetotactic entities having a propulsion system for navigating in a body of the subject using a magnetic field sufficient for influencing the direction of the magnetotactic entities, comprising:
   a table for receiving a subject;
   three pairs of magnetic heads for generating the magnetic field for influencing a direction of the magnetotactic entities in a subject; and
   a support structure, surrounding the table, for supporting each of the magnetic heads of the three pairs of magnetic heads in a configuration wherein each pair is aligned along one of three axes and wherein each of the magnetic heads of each pair of the three pairs are facing one another, wherein the magnetic heads of the three pairs surround the table,
   wherein a first magnetic head of a first pair of the three pairs is placed under the table, joined to a portion of the support structure, wherein the first magnetic head of the first pair of the three pairs is at an angle with an axis that is orthogonal with a length of the table, and wherein the support structure comprises a support arch for receiving a first magnetic head of a second pair of the three pairs of magnetic heads, a first magnetic head of a third pair of the three pairs of magnetic heads and a second magnetic head of the first pair of the three pairs of magnetic heads.

2. The system as defined in claim 1, wherein legs of the support arch are oriented with respect to one another to create an angle of 90 degrees.

3. The system as defined in claim 1, wherein the first magnetic head of the second pair of the three pairs of magnetic heads is received at or near a bottom of a first leg portion of the support arch and the first magnetic head of the third pair of the three pairs of magnetic heads is received at or near a bottom of a second leg portion of the support arch.

4. The system as defined in claim 1, wherein the support structure comprises two support arms, wherein a first of the two support arms receives a second magnetic head of a second pair of the three pairs of magnetic heads and a second of the two support arms receives a second magnetic head of a third pair of the three pairs of magnetic heads.

5. The system as defined in claim 4, wherein the first of the two support arms receives the second magnetic head of a second pair of the three pairs of magnetic heads at or near a top of the first of the two support arms and the second of the two support arms receives a second magnetic head of a third pair of the three pairs of magnetic heads at a top of the second of the two support arms.

6. The system as defined in claim 1, wherein the support structure comprises:

a support arch for receiving a first magnetic head of a first pair of the three pairs of magnetic heads, a first magnetic head of a second pair of the three pairs of magnetic heads, and a first magnetic head of a third pair of the three pairs; and two support arms, wherein a first of the two support arms receives a second magnetic head of the second pair of the three pairs of magnetic heads and a second of the two support arms receives a second magnetic head of the third pair of the three pairs of magnetic heads.

7. The system as defined in claim 5, wherein the two support arms are each positioned on opposite sides at or near a first end of the table and the support arch is positioned at or near a second end of the table opposite the first end of the table.

8. The system as defined in claim 6, further comprising an x-ray image intensifier located between the support arch and one of the two support arms for generating imaging information of the subject.

9. The system as defined in claim 1, further comprising an actuator for displacing the table along at least one of the three axes.

10. The system as defined in claim 9, wherein the actuator is configured to displace the table vertically.

11. The system as defined in claim 8, wherein the actuator is configured to rotate the table.

12. The system as defined in claim 1, wherein the three pairs of magnetic heads are configured to generate a 3D convergence point that is a point, unbounded in space, to which the magnetotactic entities following a direction of the magnetic field in an aggregation zone will move to and aggregate in the body of the subject.

13. A system for steering self-propelled magnetotactic entities in a body of a subject, the system comprising:

a first vertical support oriented in a transverse direction (y-axis) and having an upper portion in communication with a first lower portion (+y) and a second lower portion (−y);

a second vertical support spaced from the first lower portion (+y) of the first vertical support in a longitudinal direction (+x);

a third vertical support spaced from the second lower portion (−y) of the first vertical support in the longitudinal direction (+x) and spaced from the second vertical support in the transverse direction (y-axis); and a first pair of opposing magnetic heads arranged along a first axis, a first magnetic head of the first pair of opposing magnetic heads being affixed to the upper portion of the first vertical support and a second magnetic head of the first pair of opposing magnetic heads being affixed to a floor, the first axis forming an acute angle with respect to a plane of the floor;

a second pair of opposing magnetic heads arranged along a second axis substantially orthogonal to the first axis, a first magnetic head of the second pair of opposing magnetic heads being affixed to the second lower portion (−y) of the first vertical support and a second magnetic head of the second pair of opposing magnetic heads being affixed to an upper portion of the second vertical support (+y); and a third pair of opposing magnetic heads arranged along a third axis substantially orthogonal to the first axis and the second axis, a first magnetic head of the third pair of opposing magnetic heads being affixed to the first lower portion (+y) of the first vertical support and a second magnetic head of the third pair of opposing magnetic heads being affixed to an upper portion of the third vertical support.

\* \* \* \* \*